(12) United States Patent
Nei et al.

(10) Patent No.: US 11,572,109 B2
(45) Date of Patent: Feb. 7, 2023

(54) VEHICLE BODY SIDE STRUCTURE

(71) Applicant: Honda Motor Co., Ltd., Tokyo (JP)

(72) Inventors: Mikihito Nei, Tokyo (JP); Koji Miyahara, Tokyo (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 17/513,887

(22) Filed: Oct. 29, 2021

(65) Prior Publication Data

US 2022/0135149 A1    May 5, 2022

(30) Foreign Application Priority Data

Oct. 30, 2020 (JP) .............................. JP2020-182337

(51) Int. Cl.
*B62D 35/00* (2006.01)
*B62D 25/02* (2006.01)

(52) U.S. Cl.
CPC ............ *B62D 35/008* (2013.01); *B62D 25/02* (2013.01); *B62D 25/025* (2013.01); *B62D 35/00* (2013.01)

(58) Field of Classification Search
CPC ...... B62D 35/00; B62D 35/008; B62D 25/02; B62D 25/16; B62D 25/025; B62D 25/18; Y02T 10/82

USPC ..................................... 296/198, 208, 180.1
See application file for complete search history.

(56) References Cited

U.S. PATENT DOCUMENTS 9,821,860 B2    11/2017   Haas et al.

FOREIGN PATENT DOCUMENTS

| DE | 102008060410 A1 | * | 6/2010 | ............. | B62D 25/02 |
| DE | 102008006103 B4 | * | 12/2017 | ............. | B60K 11/08 |

* cited by examiner

*Primary Examiner* — Dennis H Pedder
(74) *Attorney, Agent, or Firm* — JCIPRNET (57) ABSTRACT

A vehicle body side structure is provided. A vehicle body side structure includes a front fender, a side sill garnish, and an aerodynamic duct. The front fender has a fender recess portion below a first wheel arch portion. The side sill garnish has a second wheel arch portion that faces the fender recess portion at the outer side in the vehicle width direction at interval and faces a rear end of the first wheel arch portion. The aerodynamic duct is interposed between the second wheel arch portion and the fender recess portion. The width of the second wheel arch portion gradually decreases in the front-rear direction of the vehicle body as it extends upward from the front end portion of the side sill garnish to an upper edge.

10 Claims, 9 Drawing Sheets

VEHICLE BODY SIDE STRUCTURE

CROSS-REFERENCE TO RELATED APPLICATION

This application claims the priority benefits of Japanese application no. 2020-182337, filed on Oct. 30, 2020. The entirety of the above-mentioned patent application is hereby incorporated by reference herein and made a part of this specification.

BACKGROUND

Technical Field

The disclosure relates to a vehicle body side structure.

Description of Related Art

As a vehicle body side structure, for example, there is known an aerodynamic duct formed between a wheel arch protector and a fender, wherein the front end portion of the aerodynamic duct is opened inside the wheel housing, and the rear end portion of the aerodynamic duct is opened outside the side surface of the vehicle body. According to the vehicle body side structure, the inside of the wheel housing is communicated with the outside of the vehicle body side surface through the aerodynamic duct. Therefore, the air in the wheel housing can flow through the aerodynamic duct to the outside of the vehicle body side surface (see, for example, Patent Literature 1).

RELATED ART

Patent Literature

[Patent Literature 1] U.S. Pat. No. 9,821,860

However, in the vehicle body side structure of Patent Literature 1, the rear edge of the wheel arch protector (i.e. the rear end portion of the aerodynamic duct) is limited to a vertical line of a belt having a uniform width along the wheel arch. Thus, for example, the degree of freedom in designing the vehicle appearance is limited, and from such viewpoint there is room for improvement.

An object of the disclosure is to provide a vehicle body side structure in which the degree of freedom in designing the vehicle appearance is enhanced.

SUMMARY

In order to solve the above problem, the disclosure proposes the following means.

(1) The vehicle body side structure according to the disclosure includes a fender (such as a front fender 12 of the embodiment) having a recess portion (such as a fender recess portion 23 of the embodiment) below a first wheel arch portion (such as a first wheel arch portion 24 of the embodiment); a side sill garnish (such as a side sill garnish 14 of the embodiment) including a second wheel arch portion (such as a second wheel arch portion 31 of the embodiment) at a front end portion (such as a front end portion 14a of the embodiment), wherein the second wheel arch portion faces the fender recess portion at interval outward in a vehicle width direction and faces at least a rear end of the first wheel arch portion (such as a rear end 24a of the embodiment); and a duct (such as an aerodynamic duct 15 of the embodiment) interposed between the second wheel arch portion and the recess portion and communicating from a front edge (such as a front edge 31b of the embodiment) to a rear edge (such as a rear edge 31e and a rear edge 31g of the embodiment) of the second wheel arch portion; wherein the second wheel arch portion forms a wheel arch (such as a wheel arch 32 of the embodiment) together with the first wheel arch portion, and a width in a front-rear direction of the vehicle body (such as an arch width W1 of the embodiment) gradually decreases as the second wheel arch extends upward from the front end portion of the side sill garnish to an upper edge (such as an upper edge 31a of the embodiment).

DESCRIPTION OF THE EMBODIMENTS

According to such configuration, the second wheel arch portion is integrally formed at the front end portion of the side sill garnish. Further, the second wheel arch portion is extended to face at least the rear end of the first wheel arch portion. The length of this extension is free to exceed the length of the embodiment. For example, the second wheel arch portion may be extended to near the front end of the first wheel arch portion. By integrally forming the second wheel arch portion at the front end portion of the side sill garnish, the aerodynamic duct can be arranged in different sizes and shapes between the second wheel arch portion of different lengths and the recess portion.

Moreover, as the second wheel arch portion extends upward from the front end portion of the side sill garnish to the upper edge, the width in the front-rear direction of the vehicle body is gradually reduced. For example, if the front edge of the second wheel arch portion is a vertical line along the wheel arch, the rear edge may be inclined to the rear of the vehicle body from the upper edge of the second wheel arch portion downward in the side view. By inclining the rear edge of the second wheel arch portion in this way, the rear edge of the second wheel arch portion is not limited to vertical. Therefore, the inclination of the rear edge of the second wheel arch portion can be arbitrarily changed. As a result, the degree of freedom in designing the vehicle appearance can be enhanced.

In such inclination, the inclination angle can be changed with respect to the ground. Also, in addition to straight lines, curvature can be changed for curved lines, and straight lines and curved lines can be combined, thereby allowing for even richer design.

(2) The duct may include a front flange (such as a front flange 53 of the embodiment) projecting from a duct front edge (such as a duct front edge 52a of the embodiment) in at least one of a vertical direction and a horizontal direction, and a rear flange (such as a rear flange 54 of the embodiment) projecting from a duct rear edge (such as a duct rear edge 52b of the embodiment) in at least one of a vertical direction and a horizontal direction.

According to such configuration, the front flange is projected from the duct front edge in at least one of the vertical direction and the horizontal direction. Further, the rear flange is projected from the duct rear edge in at least one of the vertical direction and the horizontal direction. Thereby, by changing the shape of the front flange and the rear flange, the vertical position, the horizontal position, and the inclination angle of the duct can be changed according to the aerodynamic characteristics (needs).

(3) The front flange may form a front wall of the second wheel arch portion, and the rear flange may form a rear wall of the second wheel arch portion.

According to such configuration, the front flange of the duct forms the front wall of the second wheel arch portion, and the rear flange of the duct forms the rear wall of the second wheel arch portion. As a result, the second wheel arch portion can be reinforced with the front flange and the rear flange (i.e. the duct).

(4) The second wheel arch portion may be formed with an upper bent piece (such as an upper bent piece 35 of the embodiment) facing the bent portion (such as a bent portion 22 of the embodiment) for forming the recess portion in the fender.

According to such configuration, an upper bent piece is formed at the second wheel arch portion, and the upper bent piece is made to face the bent portion of the fender. In the fender, the recess portion is formed by the bent portion. Therefore, by making the upper bent piece face the bent portion and forming the recess portion of the fender with the upper bent piece and the bent portion as the boundary, the relative positional deviation between the first wheel arch portion and the second wheel arch portion in the vehicle width direction and the vertical direction can be made less noticeable.

(5) The rear edge of the second wheel arch portion is bent inward in the vehicle width direction toward the recess portion and formed into a rear bent piece (such as a rear bent piece 38 of the embodiment) covering the duct rear edge (such as an outer edge 61b of the first rear flange of the embodiment).

According to such configuration, the rear edge of the second wheel arch portion is formed into a rear bent piece facing the recess portion, and the rear bent piece covers the duct rear edge. Here, a duct structure is formed by the duct and the second wheel arch portion. As a result, the design surface of the structure of the duct rear edge can be formed by the second wheel arch portion (i.e. the side sill garnish), and the duct structure can be simplified.

According to the disclosure, the width in the front-rear direction of the vehicle body is gradually reduced as the second wheel arch portion extends upward from the front end portion of the side sill garnish to the upper edge, so as to match the width of the rear end of the first wheel arch portion. As a result, the degree of freedom in design can be enhanced in designing the vehicle appearance around the wheel arch.

Hereinafter, a vehicle body side structure according to an embodiment of the disclosure is described with reference to the drawings. In the drawings, an arrow FR indicates the front side of the vehicle, an arrow UP indicates the upper side of the vehicle, and an arrow LH indicates the left side of the vehicle. The vehicle is not limited in use and kind particularly but an automatic vehicle is illustrated as an example of an embodiment.

<Vehicle>

Figure 1:
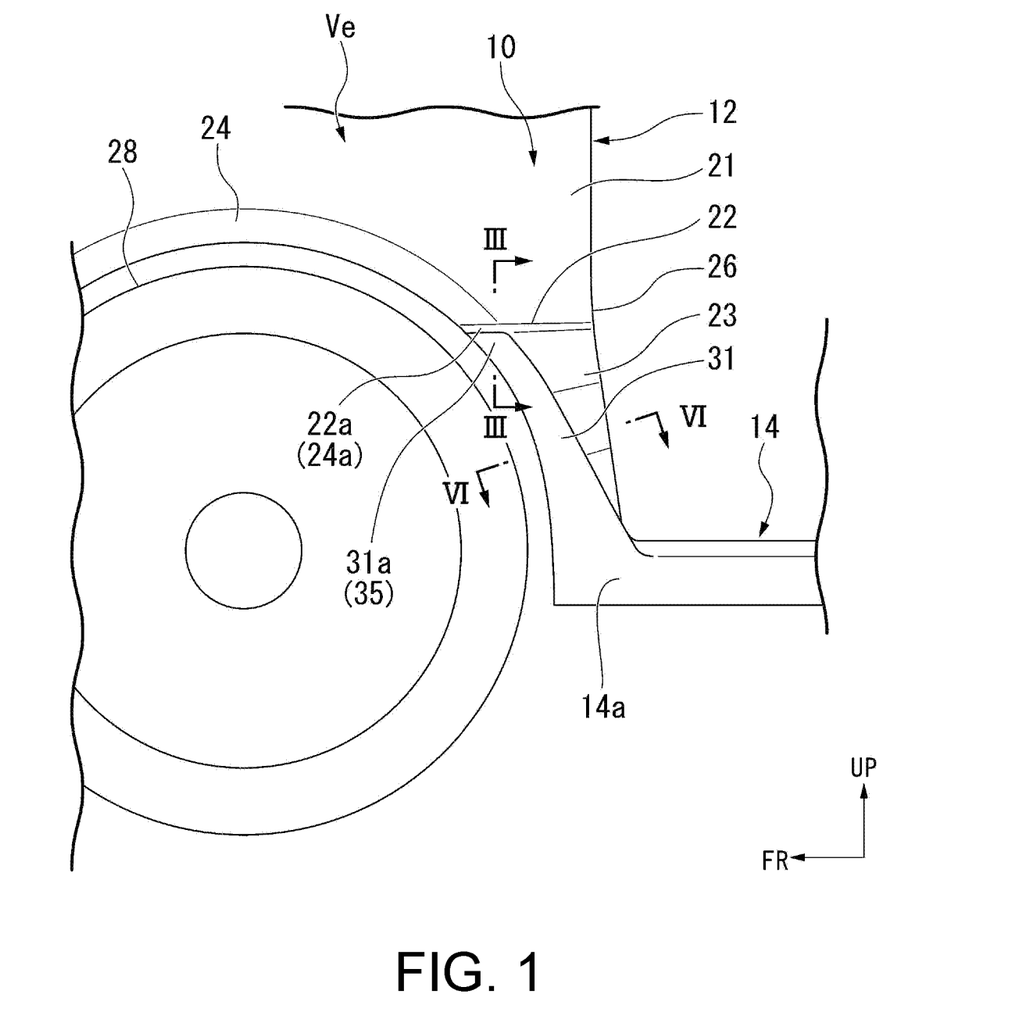
FIG. 1 is a side view of a vehicle body side structure according to an embodiment of the disclosure.

As shown in FIG. 1, a vehicle Ve includes, for example, a vehicle body side structure 10 (the vehicle body side structure on the right side is not shown) on the left and right sides in the vehicle width direction of the vehicle. Since the vehicle body side structure 10 is substantially symmetrical in the left and right, the configuration on the left side will be described in detail below, and the description of the configuration on the right side will be omitted.

<Vehicle Body Side Structure>

Figure 2:
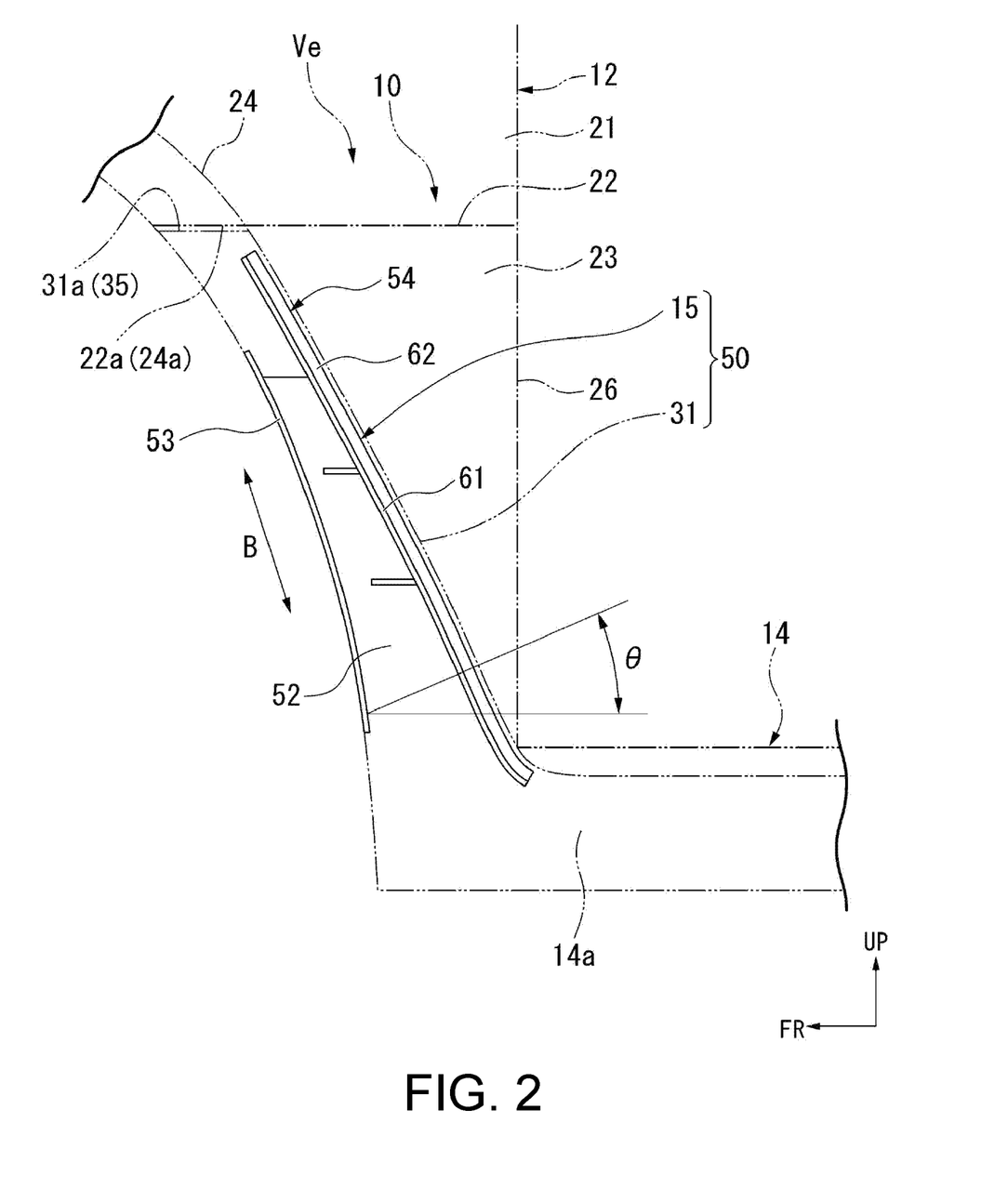
FIG. 2 is a side view through a side sill garnish in a state in which an aerodynamic duct is attached to a vehicle body side structure according to an embodiment.
Figure 3:
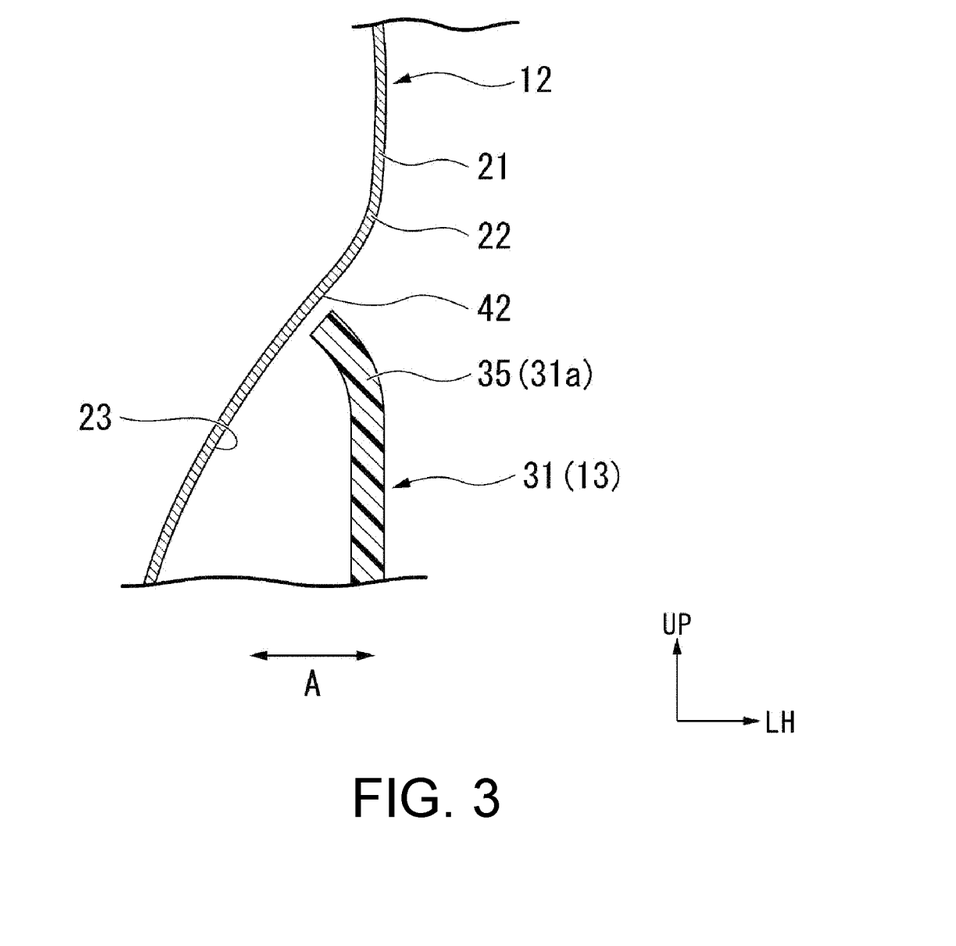
FIG. 3 is a cross-sectional view taken along line III-III of FIG. 1.

As shown in FIGS. 1 to 3, the vehicle body side structure 10 includes a front fender (fender) 12, a side sill garnish 14, and an aerodynamic duct (duct) 15.

The front fender 12 is provided so as to cover, for example, the left side portion of the engine room (not shown). The front fender 12 includes a fender main body 21, a bent portion 22, a fender recess portion (recess portion) 23, and a first wheel arch portion 24. The first wheel arch portion 24 may be a separate wheel arch protector.

The fender body 21 is provided, for example, so as to cover a left side portion of the engine room, and is provided in the front of the vehicle body at a front door opening 26. The fender body 21 has the bent portion 22 formed at a substantially central position in the vertical direction in the portions in the front of the vehicle body at the front door opening 26.

The bent portion 22 is formed in a ridge shape extending in the front-rear direction of the vehicle body and projecting outward in the vehicle width direction. By forming the bent portion 22 at the front fender 12, the fender recess portion 23 is formed at the lower side of the bent portion 22. The fender recess portion 23 is formed so as to be recessed inward in the vehicle width direction with respect to the bent portion 22. The first wheel arch portion 24 is formed along a wheel arch 32 (see FIG. 4) from a front end portion 22a of the bent portion 22 toward the front of the vehicle body. The first wheel arch portion 24 has a rear end (or a lower end at rear) formed at the front end portion 22a of the bent portion 22. Hereinafter, the rear end of the first wheel arch portion 24 may be referred to as a "rear end 24a". The first wheel arch portion 24 is a portion that covers a front wheel 28 from above.

The first wheel arch portion 24 extends toward the front of the vehicle body in a curved shape (including an arc shape) to be recessed upward along the front wheel 28. The fender recess portion 23 is formed below the rear end 24a of the first wheel arch portion 24.

A second wheel arch portion 31 of the side sill garnish 14 is provided in the fender recess portion 23. The side sill garnish 14 is, for example, a decorative member formed of a resin material and attached to a side sill (not shown) from the outside in the vehicle width direction. The side sill is, for example, a highly rigid vehicle body frame member that forms the lower portion of the front door opening 26 and the rear door opening (not shown).

Figure 4:
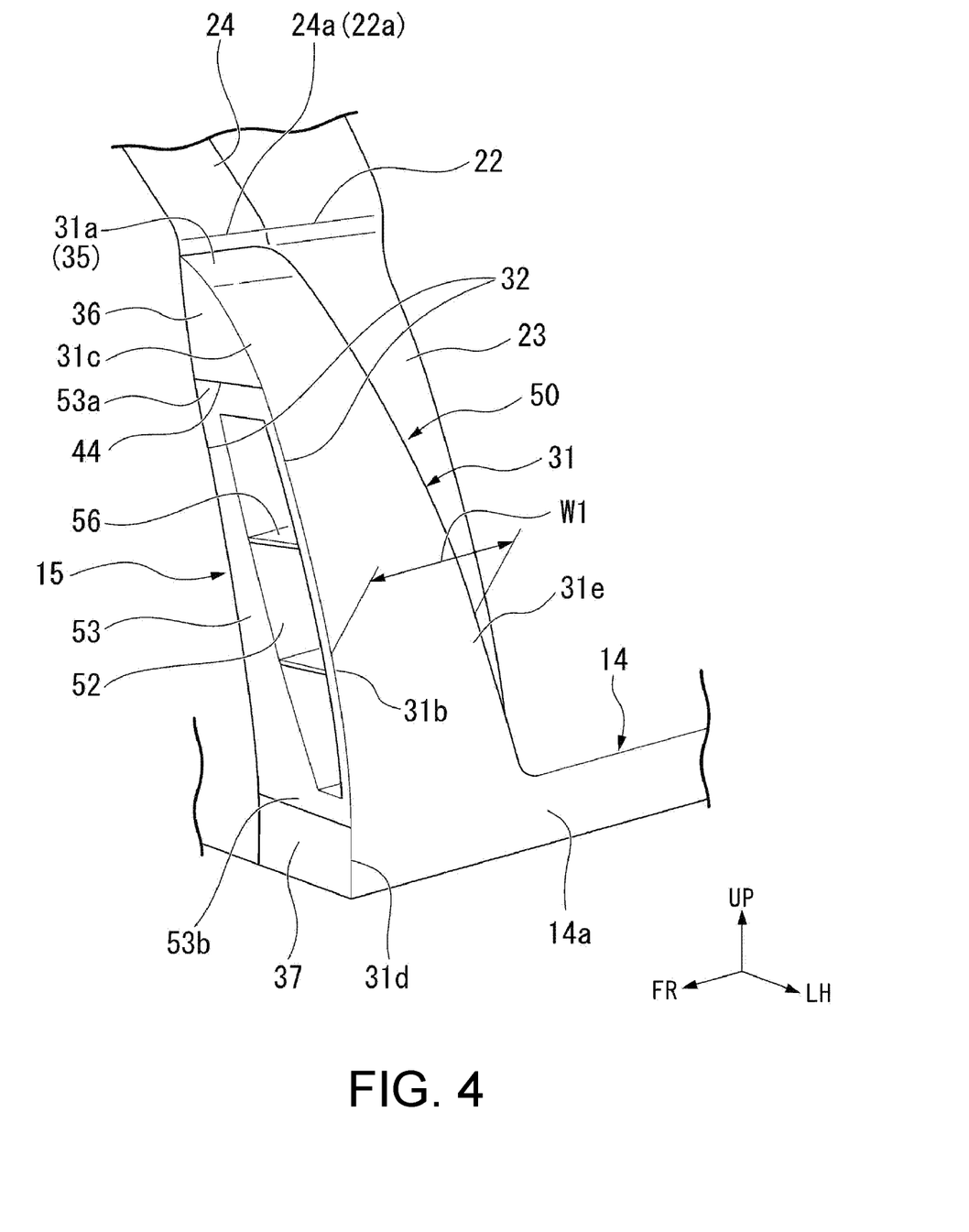
FIG. 4 is a perspective view of a vehicle body side structure according to an embodiment as viewed from the front left.
Figure 5:
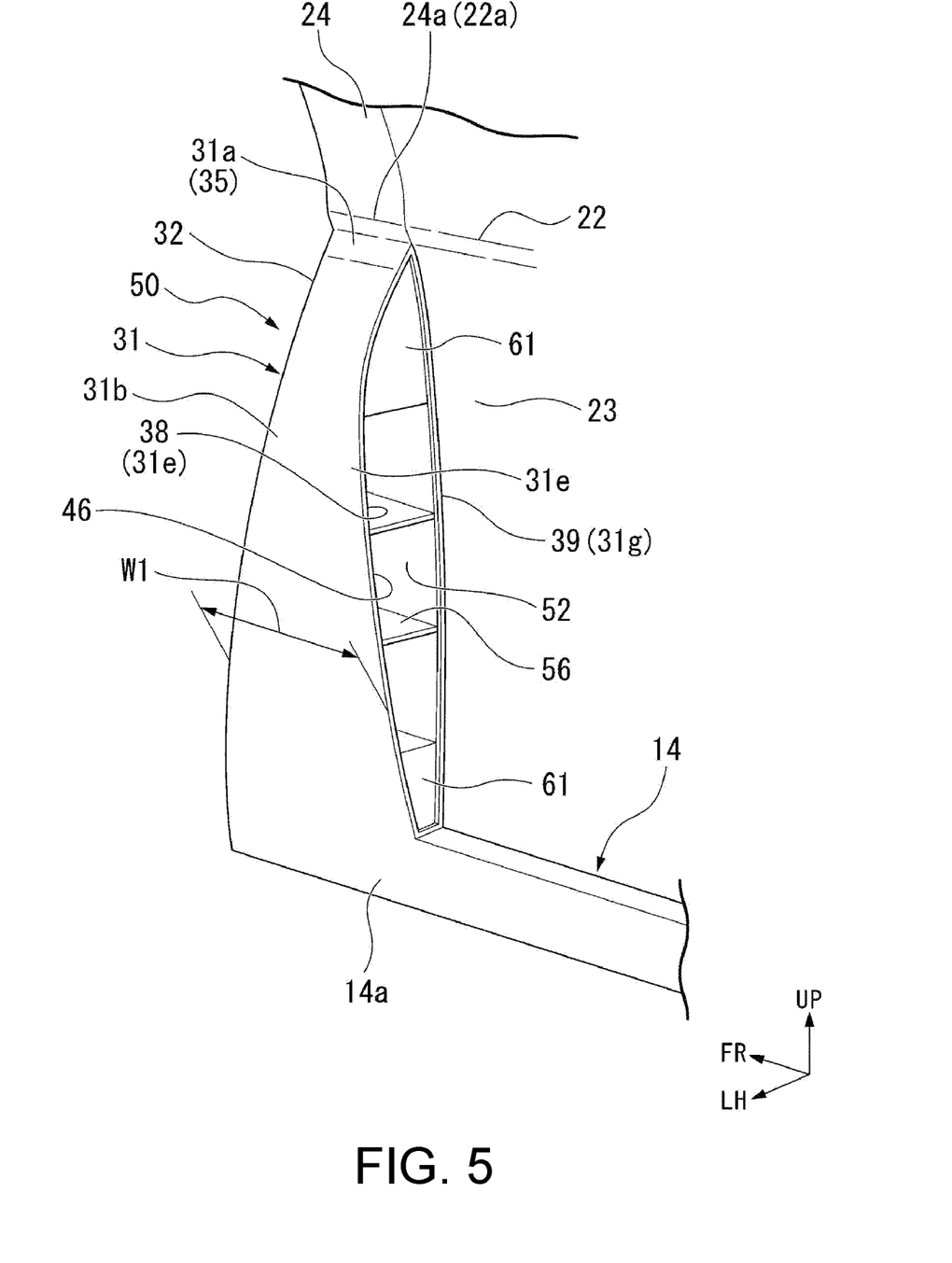
FIG. 5 is a perspective view of a vehicle body side structure according to an embodiment as viewed from the left rear.

As shown in FIGS. 4 and 5, the side sill garnish 14 has the second wheel arch portion 31 integrally formed with a front end portion 14a. The second wheel arch portion 31 forms an upper extension portion that extends upward from the front end portion 14a of the side sill garnish 14 to the rear end 24a of the first wheel arch portion 24.

The second wheel arch portion 31 faces the fender recess portion 23 at interval outward in the vehicle width direction. Further, the second wheel arch portion 31 is formed so as to face the rear end 24a of the first wheel arch portion 24 in the vertical direction. Moreover, in the embodiment, an example in which the second wheel arch portion 31 faces the rear end 24a of the first wheel arch portion 24 is described, but the disclosure is not limited thereto. As another example, the second wheel arch portion 31 may be extended to a portion in the middle between the rear end 24a and the front end (not shown) of the first wheel arch portion 24, or to the vicinity of the front end while overlapping.

The second wheel arch portion 31 is connected downward from the rear end 24a of the first wheel arch portion 24, so as to form the wheel arch 32 (the recess portion in the lower portion of the vehicle body along the front wheel 28 (see FIG. 1)) together with the first wheel arch portion 24.

The second wheel arch portion 31 is formed such that an arch width W1 in the front-rear direction of the vehicle body (a width in the front-rear direction of the vehicle body) gradually decreases (or the rear edge approaches the front edge) with reference to the wheel arch 32 as the second wheel arch portion 31 extends upward from the front end portion 14a of the side sill garnish 14 to an upper edge 31a. The reason for gradually reducing the arch width W1 will be described in detail later.

As shown in FIGS. 3, 4, 5, and 6, for example, the second wheel arch portion 31 includes an upper bent piece 35, a first front wall portion 36, a second front wall portion 37, a rear bent piece (rear bent piece) 38, and a second rear bent piece 39.

The upper bent piece 35 is formed by bending the upper edge 31a of the second wheel arch portion 31 so as to face the front end portion 22a of the bent portion 22 (i.e. the rear end 24a of the first wheel arch portion 24).

By making the front edge of the upper bent piece 35 face the front end portion 22a of the bent portion 22, a recess portion 42 of the front fender 12 can be formed by using the upper bent piece 35 and the bent portion 22 as the boundary. As a result, the relative positional deviation of the upper bent piece 35 with respect to the bent portion 22 in the vehicle width direction (direction of an arrow A) or in the vertical direction can be tolerated by the recess portion 42 and made less noticeable.

In the embodiment, an example in which the upper bent piece 35 is made to face the rear end 24a of the first wheel arch portion 24 is described, but the disclosure is not limited thereto. As another example, for example, when the first wheel arch portion 24 is provided with the wheel arch protector, the upper bent piece 35 may be made to face the rear end (bent portion) of the wheel arch protector.

The first front wall portion 36 is formed at a front upper portion 31c of a front edge 31b (the wheel arch 32) of the second wheel arch portion 31. The first front wall portion 36 projects from the front upper portion 31c of the second wheel arch portion 31 inward in the vehicle width direction to the fender recess 23.

The second front wall portion 37 is formed at a front lower portion 31d of the front edge 31b (the wheel arch 32) of the second wheel arch portion 31. The second front wall portion 37 projects from the front lower portion 31d of the second wheel arch portion 31 to the fender recess portion 23 inward in the vehicle width direction.

The first front wall portion 36 and the second front wall portion 37 form a part of the front wall (i.e. the upper front wall and the lower front wall) of the second wheel arch portion 31. A front opening portion 44 is opened between the first front wall portion 36 and the second front wall portion 37.

The first rear bent piece 38 is formed such that a rear edge 31e at the outer side in the vehicle width direction of the second wheel arch portion 31 is bent inward in the vehicle width direction toward the fender recess portion 23.

The reason for forming the first rear bent piece 38 at the rear edge of the second wheel arch portion 31 will be described later more properly.

The second rear bent piece 39 is formed such that a rear edge 31g at the inner side in the vehicle width direction of the second wheel arch portion 31 is bent outward in the vehicle width direction from the fender recess portion 23. Specifically, an inner rib 31f is formed at the inner side of the second wheel arch portion 31 in the vehicle width direction, and the second rear bent piece 39 is formed by bending the rear edge 31g of the inner rib 31f outward in the vehicle width direction from the fender recess portion 23. A base 31h of the inner rib 31f, for example, is joined or abutted to the fender recess portion 23 via a cushion material (not shown).

The reason for forming the second rear bent piece 39 at the rear edge of the second wheel arch portion 31 will be described later more properly.

The first rear bent piece 38 and the second rear bent piece 39 form a part of the rear wall (i.e. the rear peripheral wall) of the second wheel arch portion 31. A rear opening portion 46 is opened between the first rear bent piece 38 and the second rear bent piece 39.

(Aerodynamic Duct)

Figure 6:
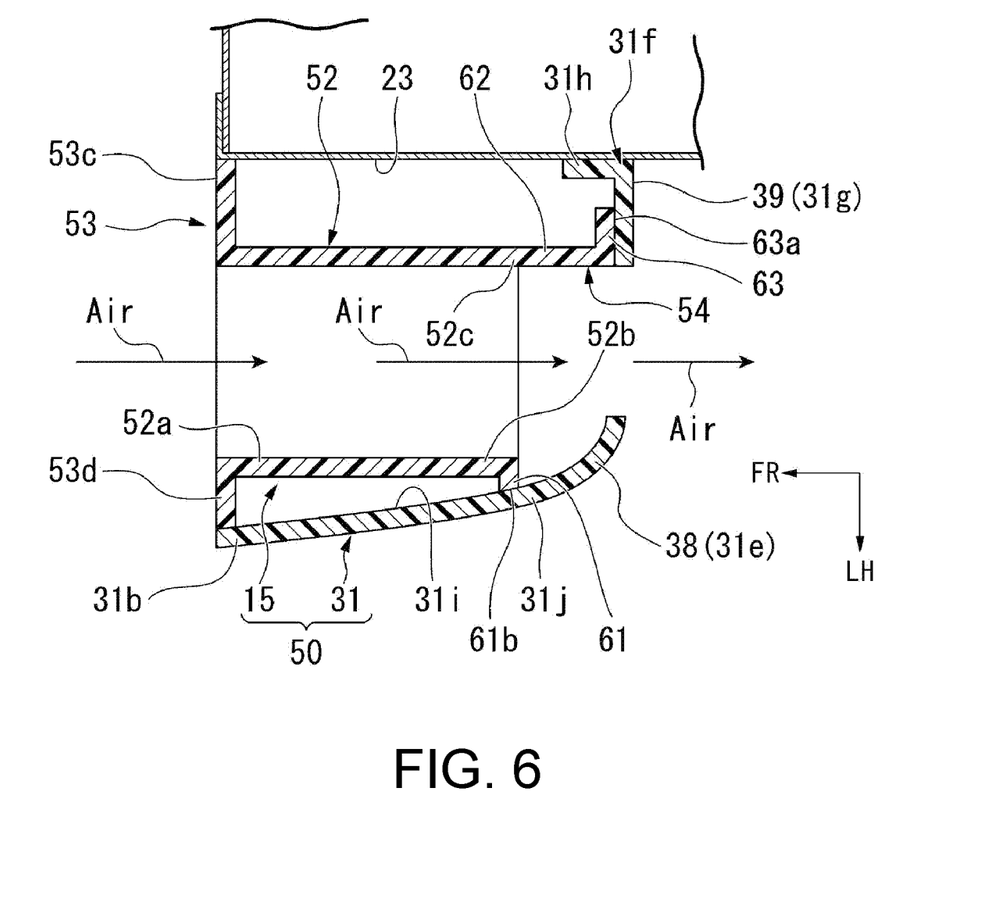
FIG. 6 is a cross-sectional view taken along line VI-VI of FIG. 1.

As shown in FIGS. 2 and 6, the aerodynamic duct 15 is interposed between the second wheel arch portion 31 and the fender recess portion 23 in the vehicle width direction. An aerodynamic duct structure 50 is formed by the aerodynamic duct 15 and the second wheel arch portion 31.

The aerodynamic duct 15 is formed so as to communicate from the front edge 31b of the second wheel arch portion 31 to the rear bent piece (i.e. the rear edge 31e) 38. The Aerodynamic duct 15 is a duct for flowing the air in the wheel housing to the outside surface of the vehicle body side as shown by an arrow Air.

Figure 7:
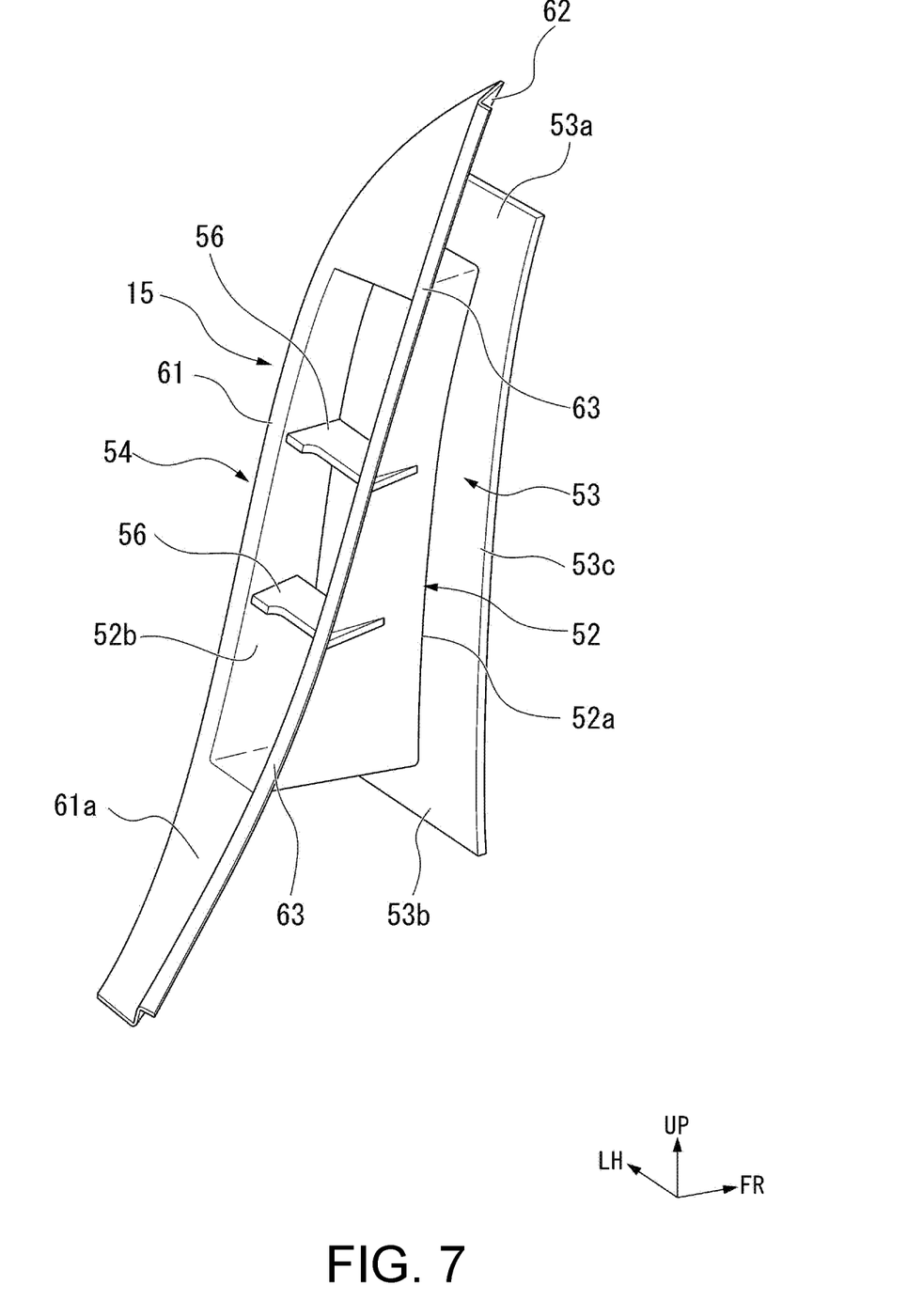
FIG. 7 is a perspective view showing an aerodynamic duct according to an embodiment.
Figure 8:
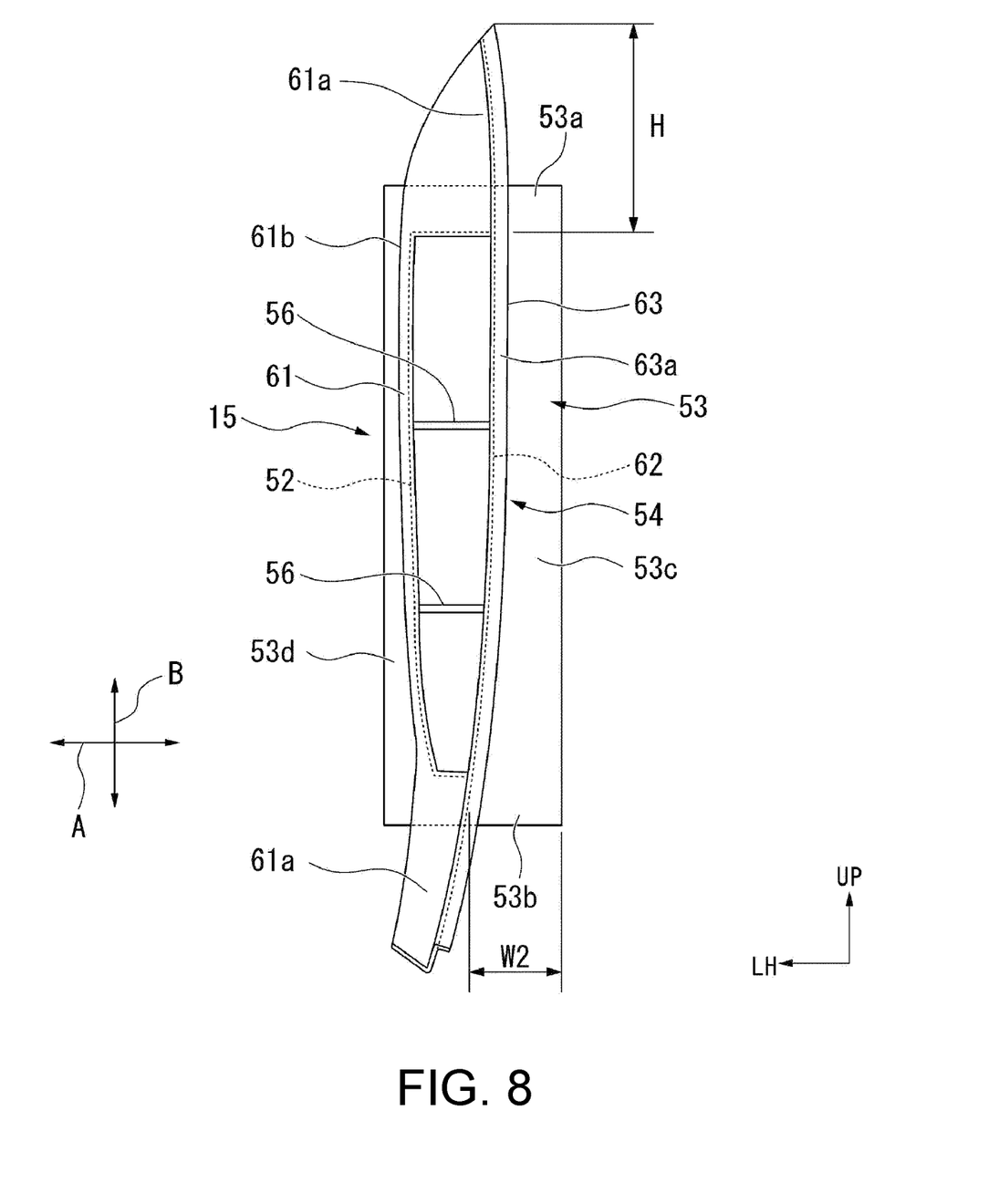
FIG. 8 is a rear view showing an aerodynamic duct according to an embodiment.

As shown in FIGS. 6 to 8, the aerodynamic duct 15 is integrally formed with, for example, a resin material, and has a duct body 52, a front flange 53, and a rear flange 54.

The duct body 52 is formed in a hollow body having a rectangular cross section, and is communicated from a duct front edge 52a to a duct rear edge 52b. The duct front edge 52a is opened inside the wheel housing. The duct rear edge 52b is opened outward in the vehicle width direction of the fender recess portion 23 (i.e. the outside of the vehicle body side surface).

Multiple partition walls 56 are formed inside the duct body 52, for example. In the embodiment, two partition walls 56 are illustrated as the multiple partition walls 56, but the number of partition walls 56 can be arbitrarily set. By forming the partition walls 56 inside the duct body 52, air can flow smoothly inside the duct body 52, and the duct body 52 can be reinforced.

The front flange 53 is provided at the duct front edge 52a. The front flange 53 projects vertically and horizontally from the duct front edge 52a. The front flange 53 is formed in a rectangular shape by an upper side portion 53a, a lower side portion 53b, a right side portion (inner side portion) 53c, and a left side portion (outer side portion) 53d.

The upper side portion 53a is connected to the first front wall portion 36 (see FIG. 4), and the lower side portion 53b is connected to the second front wall portion 37 (see FIG. 4). Further, the right side portion 53c is connected to the fender recess portion 23, and the left side portion 53d is connected to the front edge 31b of the second wheel arch portion 31. Thus, the front flange 53 forms a part of the front wall (i.e. the central front wall) of the second wheel arch portion 31 in the aerodynamic duct structure 50.

Moreover, in the embodiment, an example in which the front flange 53 projects from the duct front edge 52a in the vertical direction and the horizontal direction is described, but the disclosure is not limited thereto. As another example, for example, the front flange 53 may project from the duct front edge 52a in one of the vertical direction and the horizontal direction.

The rear flange 54 is provided at the duct rear edge 52b. The rear flange 54 includes a first rear flange 61, a projecting portion 62, and a second rear flange 63. The first rear flange 61 projects in the vertical direction and the left direction of the duct rear edge 52b. The projecting portion 62 projects from a right edge (inner edge) 52c of the duct rear edge 52b and a right edge (inner edge) 61a of the first rear flange 61 toward the rear of the vehicle body. The second rear flange 63 is formed at the rear edge of the projecting portion 62. The second rear flange 63 projects toward the inside (right side) in the vehicle width direction from the rear edge of the projecting portion 62.

An outer edge 61b of the first rear flange 61 is joined to a portion 31j, of an inner wall 31i of the second wheel arch portion 31, which is in the front the vehicle body than the first rear bent piece 38. Further, a flange surface 63a of the second rear flange 63 is joined to the second rear bent piece 39. As a result, the rear flange 54 forms a part of the rear wall (i.e. the central rear wall) of the second wheel arch portion 31 in the duct structure.

Moreover, in the embodiment, an example in which the rear flange 54 is provided in the vertical direction and the horizontal direction of the duct rear edge 52b is described, but the disclosure is not limited thereto. As another example, for example, the rear flange 54 may be provided in one of the vertical direction and the horizontal direction of the duct rear edge 52b.

Thus, the front flange 53 is projected from the duct front edge 52a of the duct body 52, and the rear flange 54 is projected from the duct rear edge 52b of the duct body 52.

Therefore, as shown in FIGS. 2 and 8, for example, by changing a width W2 of the front flange 53 and changing the shape of the rear flange 54, the position of the aerodynamic duct 15 in the horizontal direction (direction of the arrow A) can be changed. Further, for example, by changing a height H of the front flange 53, the position of the aerodynamic duct 15 in the vertical direction (direction of an arrow B) can be changed. Moreover, for example, by changing an inclination angle θ of the duct body 52, the inclination angle of the aerodynamic duct 15 can be changed.

In this way, by changing the shapes of the front flange 53 and the rear flange 54, the vertical position, the horizontal position, and the inclination angle of the aerodynamic duct 15 can be changed according to the aerodynamic characteristics (needs). As a result, the air inside the wheel housing can smoothly flow to the outside of side surface of the vehicle body.

Returning from FIG. 6 to FIG. 8, a part of the front wall of the second wheel arch portion 31 is formed by the front flange 53 of the aerodynamic duct 15. Further, a part of the rear wall of the second wheel arch portion 31 is formed by the rear flange 54 of the aerodynamic duct 15. As a result, the second wheel arch portion 31 can be reinforced by the front flange 53 and the rear flange 54 (i.e. the aerodynamic duct 15).

Here, the outer edge 61b of the first rear flange 61 is joined to the portion 31j, in the second wheel arch portion 31, which is in the front of the vehicle body than the first rear bent piece 38. As described above, the first rear bent piece 38 is bent inward in the vehicle width direction toward the fender recess portion 23. Therefore, the outer edge 61b of the first rear flange 61 (i.e. the rear edge of the aerodynamic duct 15, the duct rear edge) is covered from the rear of the vehicle body by the first rear bent piece 38.

Therefore, the design surface of the outer rear edge of the aerodynamic duct structure 50 at the outer side in the vehicle width direction can be formed by the first rear bent piece 38 of the second wheel arch portion 31 (i.e. the side sill garnish 14). As a result, the aerodynamic duct structure 50 can be simplified.

Further, the flange surface 63a of the second rear flange 63 is joined to the second rear bent piece 39. Therefore, the flange surface 63a of the second rear flange 63 (i.e. the rear edge of the aerodynamic duct 15) is covered from the rear of the vehicle body by the second rear bent piece 39.

Therefore, the design surface of the inner rear edge of the aerodynamic duct structure 50 at the inner side in the vehicle width direction can be formed by the second rear bent piece 39 of the second wheel arch portion 31 (i.e. the side sill garnish 14). Thereby, the aerodynamic duct structure 50 can be simplified.

As described above, according to the vehicle body side structure 10 of the embodiment, the second wheel arch portion 31 is integrally formed at the front end portion 14a of the side sill garnish 14. Moreover, the second wheel arch portion 31 is extended so as to face at least the rear end 24a of the first wheel arch portion 24. The length of the extension is also free to exceed the length of the embodiment. For example, the second wheel arch portion 31 may be extended to a portion in the middle between the rear end 24a and the front end (not shown) of the first wheel arch portion 24, or near the front end.

By integrally forming the second wheel arch portion 31 at the front end portion 14a of the side sill garnish 14, the aerodynamic duct 15 can be easily manufactured between the second wheel arch portion 31 and the fender recess portion 23 of various lengths, and the aerodynamic duct can be arrange in different sizes and shapes. Thereby, the aerodynamic duct structure 50 can be easily manufactured by the second wheel arch portion 31 and the aerodynamic duct 15.

Figure 9:
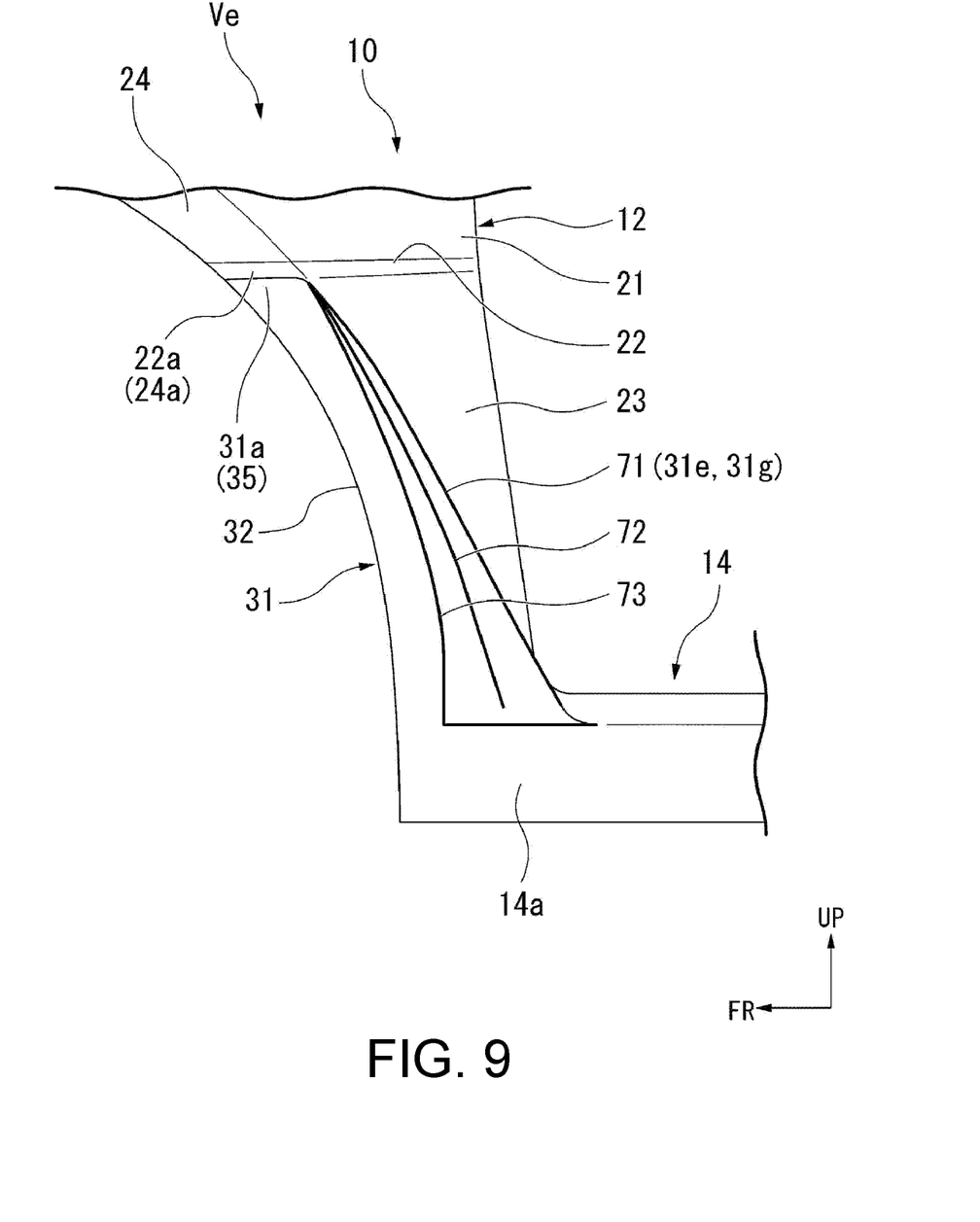
FIG. 9 is a side view showing an example of changing an inclination of a rear edge of a second wheel arch portion according to an embodiment.

Further, as shown in FIGS. 5 and 9, the arch width W1 in the front-rear direction of the vehicle body is gradually reduced as the second wheel arch portion 31 extends upward from the front end portion 14a of the side sill garnish 14 to the upper edge 31a, so as to match the width of the rear end 24a of the first wheel arch portion 24, for example. Further, for example, if the front edge 31b of the second wheel arch portion is a vertical line along the wheel arch 32, the rear edge 31e at the outer side in the vehicle width direction and the rear edge 31g at the inner side in the vehicle width direction of the second wheel arch portion 31 may be inclined to the rear of the vehicle body from the upper edge 31a of the second wheel arch portion 31 downward in a side view.

By inclining the rear edge 31e and the rear edge 31g of the second wheel arch portion 31 in this way, the rear edge of the second wheel arch portion 31 is not limited to vertical along the wheel arch 32. Therefore, the inclination of the rear edge 31e and the rear edge 31g of the second wheel arch portion 31 can be arbitrarily changed to, for example, a first inclined edge 71, a second inclined edge 72, a third inclined edge 73, and the like. Thus, the degree of freedom in designing vehicle appearance around the wheel arch 32, (freedom of design) can be enhanced.

Such tilt can be varied tilt angle with respect to the ground. Also, in addition to straight lines, curvature can be changed for curve lines, and straight lines and curves can b combined, thereby allowing even richer design.

Here, an example in which the rear edge of the second wheel arch portion is vertically formed is described as a comparative example. The rear edge of the second wheel arch portion of the comparative example is limited to vertical. Therefore, it is difficult to enhance the degree of freedom in design when designing vehicle appearance.

The technical scope of the disclosure is not limited to the above-described embodiments, and various modifications can be made without departing from the spirit of the disclosure.

In addition, to the extent that it does not depart from the spirit of the disclosure, it is possible to replace the components in the embodiment with well-known components as appropriate, and the above-mentioned modifications may be appropriately combined.

What is claimed is:

1. A vehicle body side structure, comprising:
    a fender, having a recess portion below a first wheel arch portion;
    a side sill garnish, comprising a second wheel arch portion at a front end portion, wherein the second wheel arch portion faces the fender recess portion at interval outward in a vehicle width direction and faces at least a rear end of the first wheel arch portion; and
    a duct, interposed between the second wheel arch portion and the recess portion and communicating from a front edge to a rear edge of the second wheel arch portion; wherein
    the second wheel arch portion forms a wheel arch together with the first wheel arch portion; and
    a width in a front-rear direction of the second wheel arch portion gradually decreases as the second wheel arch portion extends upward from the front end portion of the side sill garnish to an upper edge.

2. The vehicle body side structure according to claim 1, wherein
    the duct comprises a front flange projecting from a duct front edge in at least one of a vertical direction and a horizontal direction, and a rear flange projecting from a duct rear edge in at least one of the vertical direction and the horizontal direction.

3. The vehicle body side structure according to claim 2, wherein
    the front flange forms a front wall of the second wheel arch portion, and
    the rear flange forms a rear wall of the second wheel arch portion.

4. The vehicle body side structure according to claim 1, wherein
    the second wheel arch portion is formed with an upper bent piece facing a bent portion for forming the recess portion in the fender.

5. The vehicle body side structure according to claim 2, wherein
    the second wheel arch portion is formed with an upper bent piece facing a bent portion for forming the recess portion in the fender.

6. The vehicle body side structure according to claim 3, wherein
    the second wheel arch portion is formed with an upper bent piece facing a bent portion for forming the recess portion in the fender.

7. The vehicle body side structure according to claim 1, wherein
    the rear edge of the second wheel arch portion is bent inward in the vehicle width direction toward the recess portion and formed into a rear bent piece covering a duct rear edge.

8. The vehicle body side structure according to claim 2, wherein
    the rear edge of the second wheel arch portion is bent inward in the vehicle width direction toward the recess portion and formed into a rear bent piece covering the duct rear edge.

9. The vehicle body side structure according to claim 3, wherein
    the rear edge of the second wheel arch portion is bent inward in the vehicle width direction toward the recess portion and formed into a rear bent piece covering the duct rear edge.

10. The vehicle body side structure according to claim 4, wherein
    the rear edge of the second wheel arch portion is bent inward in the vehicle width direction toward the recess portion and formed into a rear bent piece covering a duct rear edge.

* * * * *